United States Patent [19]
Carter et al.

[11] 3,754,275
[45] Aug. 21, 1973

[54] METHOD AND APPARATUS FOR CORRELATING A PIPELINE INSPECTION RECORD TO KNOWN EXTERNAL LOCATIONS

[75] Inventors: Nick G. Carter; Charles C. Moore, III, both of Houston, Tex.

[73] Assignee: AMF Incorporated, White Plains, N.Y.

[22] Filed: Sept. 17, 1971

[21] Appl. No.: 181,406

[52] U.S. Cl............... 346/1, 73/40.5, 324/67, 324/34 R, 340/282, 346/33 P
[51] Int. Cl............................................. G01d 5/00
[58] Field of Search............... 346/33 P, 33 M, 1, 346/74 M; 73/40.5; 324/67; 340/239 R, 282, 34 R

[56] References Cited
UNITED STATES PATENTS
2,601,248 6/1952 Brenholdt ........................... 324/67
2,944,867 7/1960 Gregory .............................. 346/59
3,162,505 12/1964 Hall ................................. 346/33 P Primary Examiner—Joseph W. Hartary
Attorney—George W. Price and John H. Gallagher

[57] ABSTRACT

Apparatus and methods are disclosed for correlating a pipeline inspection record to known external locations along the pipeline. Inspection signals produced by inspection apparatus transported through a pipeline are recorded on magnetic tape along with regularly occurring coded time signals produced by a time code generator. At known locations external to the pipeline the passage of the inspection apparatus through the pipeline is detected and the exact time of passage is recorded either at the respective known locations, or via telemetry, at a base station. Magnetic tape having inspection signals and time coded signals is correlated with time signals recorded when inspection apparatus passed known locations to indicate the position of known external locations on the inspection record.

17 Claims, 5 Drawing Figures

FIG. 1

INVENTORS
NICK G. CARTER
CHARLES C. MOORE, III
BY
John H. Gallagher
ATTORNEY

METHOD AND APPARATUS FOR CORRELATING A PIPELINE INSPECTION RECORD TO KNOWN EXTERNAL LOCATIONS

BACKGROUND OF THE INVENTION

Buried pipelines are inspected to detect anomalies in the wall of the pipe by passing an instrumented device called a pig through the pipeline. The pig is propelled through the pipeline by the fluid product being transported therethrough and nondestructive testing apparatus carried by the pig continuously inspects the condition of the pipe. Electrical inspection signals produced by the testing apparatus are continuously recorded on a magnetic tape recorder, for example, which is carried by the pig. After the instrumented pig has completed its inspection run through a section of the pipeline, the tape record is recovered and played back on appropriate apparatus to produce a visual record of the inspection signals. An operator then views and interprets the visual record to determine the condition of the pipe.

After viewing the inspection record it may be concluded that one or more locations along the pipeline should be excavated in order to inspect the pipe in further detail and/or to replace one or more lengths of pipe. Because an inspection run of the instrumented pig may traverse from fifty up to or exceeding one hundred miles of the buried pipeline, the inspection record necessarily is made on a greatly reduced linear scale with the consequence that accurate determination of distance and correlation of the record to known external locations are difficult.

Considerable trouble and expense are involved in excavating any point along the pipeline. Consequently, to avoid excavating at the wrong locations, it is extremely important that the recorded inspection signals be accurately correlated to actual distance along the pipeline and to known external locations along the pipeline. In the past it has been difficult to achieve the desired accuracy in this correlation. The inspection apparatus usually produces a discernable signal each time the apparatus passes a girth weld in the pipeline. The lengths of sections of pipe between girth welds may be obtained from construction records of the pipeline, and by counting the number of girth welds on a record, an estimate of actual distance on the record may be made. However, in interpreting a complete record which may represent from 50 up to 100 miles of pipeline, it is easy for an operator to error in counting the many signals which correspond to girth welds.

SUMMARY

In accordance with one embodiment of the invention, an instrumented pipeline pig carrying nondestructive testing apparatus, a time code generator, and a magnetic tape recorder is passed through a section of buried pipeline. At external locations spaced along the route of the pipeline at intervals of approximately a mile, means are provided for detecting the passage of the pig past the respective locations. Means also are provided at each external location to transmit a unique location identification signal to a base station at the instant the pig is detected.

The base station includes means for receiving the transmissions from the known locations and for recording the location identifying signals along with coded time signals from a time code generator located at the base station. The base station time code generator has a known time relationship to the time code generator carried by the pipeline pig. The time coded signals recorded at the base station are correlated with the time signals on the record made in the pig and an inspection record is produced having thereon the inspection signals and time signals recorded in the pig, and indicia which identifies on the record the known external locations.

DESCRIPTION OF PREFERRED EMBODIMENTS

Figure 1:
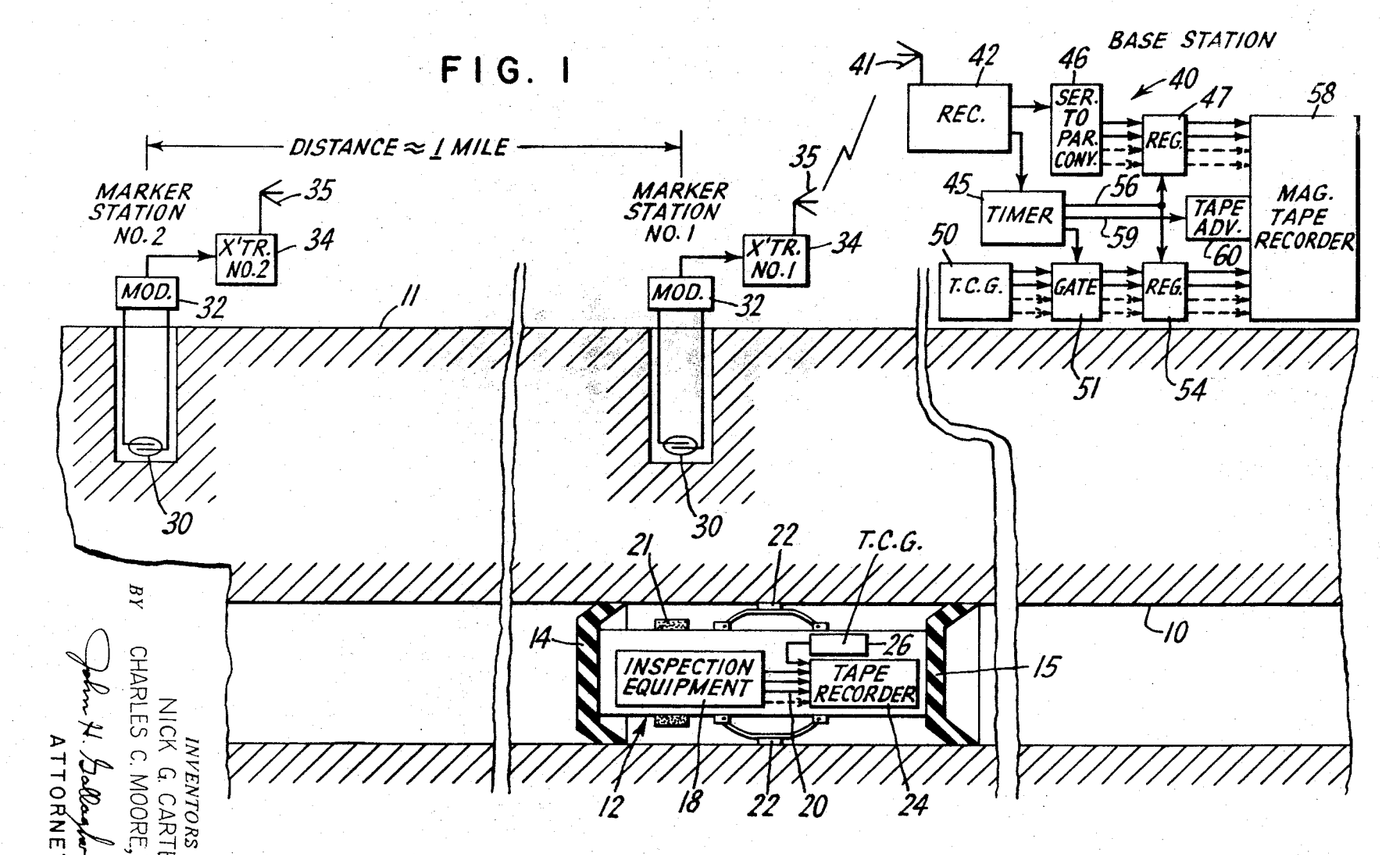
FIG. 1 is a simplified illustration of apparatus for making two magnetic tape recordings; one having inspection signals and coded time signals recorded thereon, and the other having time coded signals and marker station signals which indicate when the inspection pig passed a respective marker station.

In FIG. 1, a pipeline 10 is buried perhaps three or four feet below the surface of the ground 11. FIG. 1 is intended to represent several miles along a pipeline. For simplicity of illustration and discussion, only several segments have been illustrated. An instrumented pipeline pig 12 is illustrated at a particular location within the pipeline. The pig includes elastomeric packers 14 and 15 which are in sliding contact with the wall of the pipeline. The fluid product being transported through the pipeline urges against packers 14 and 15 to propel the pig through the line.

Pig 12 contains inspection equipment 18 for conducting nondestructive testing or inspection of the pipeline as the pig is propelled therethrough. Inspection equipment 18 may include one or more of many known types, such as magnetic, eddy current, acoustic, ultrasonic, or radiological. Whatever type of inspection is performed, it is assumed that the equipment produces inspection signals on one or more output leads 20. The inspection signals contain information relative to the condition of the pipe.

As illustrated in simplified form in FIG. 1, pig 12 is instrumented to perform magnetic flux leakage type of inspection. A source of magnetic flux 21 establishes a flux field in the wall of pipeline 10. Flux source 21 may be a solenoid which is energized by batteries carried by pig 12. A plurality of flux leakage detector means 22 are carried by the pig and are in sliding contact about the wall of the pipe to detect leakage flux caused by anomalies in the pipe wall. Anomaly signals from detector means 22 are appropriately processed by the inspection equipment 18 and appear in analog form on output leads 20. The inspection signals may be converted to digital form by equipment carried by pig 12 if it is so desired.

Pig 12 also carries recording apparatus such as magnetic tape recorder 24 which has the capability of recording many input signals on respective tracks on the magnetic tape.

A time code generator (TCG) 26 also is carried in pig 12 and its coded output signals which occur at regular intervals of 1 second, for example, are recorded on one or more appropriate tracks on tape recorder 24. Many types of time code generators are known and may be used in the practice of this invention. In general, time code generator 26 includes an accurate digital clock and means to provide a time code output in a given format. Although FIG. 1 illustrates one output lead from time code generator 26, it is to be understood that there may be a number of parallel output leads which correspond to the number of bits in the particular code format employed. There are a multitude of codes and formats known in the art, and any may be employed. One example of a suitable time code generator is Model 8150 produced by Systron-Donner Corp., Concord, Calif. This generator is capable of being synchronized with a known time standard such as the time transmissions from the radio stations of the U.S. National Bureau of Standards. At least two outputs are provided by this time code generator. One is a standard IRIG B BCD time code format, and the other is a standard BCD digital clock output.

In accordance with this invention, marker stations are temporarily established at spaced intervals of perhaps each mile along the route of the section of pipeline to be inspected. Each marker station is comprised of a sensor means 30 which is capable of detecting the presence of pig 12 as it passes the marker station. Sensor means 30 may be housed within a tube or stake which is driven into the ground immediately above pipeline 10. As illustrated in FIG. 1, sensor 30 is a reed type proximity switch which normally is in the open condition. In the presence of magnetic flux lines that extend parallel to the reed contacts of the switch, the reed contacts are forced into contacting relationship to close the switch. A suitable reed type proximity switch is described in U.S. Pat. No. 3,544,934. In the embodiment of the invention illustration in FIG. 1, the magnetic field established by solenoid 21 on pig 12 will extend outwardly beyond pipeline 10 and will be sensed by the reed switch. Other sensing arrangements may be employed. For example, pig 12 may carry means for radiating electromagnetic, acoustic, ultrasonic, or radiological energy and sensor means 30 will be a suitable detector which actuates a relay or other circuitry when it senses the radiation from the pig.

Sensor 30 is connected to a modulator circuit 32 and activates that circuit when pig 12 is detected. Modulator 32 produces a modulating signal which keys a radio transmitter 34 associated with each marker station. The signal from transmitter 34 is radiated by antenna 35 toward a base station 40 which will be described below. Because it is desired to know when pig 10 passes each of the marker stations, it is preferable that the modulator 32 associated with each marker station generate a coded signal unique to that station.

Base station 40 includes antenna 41 and radio receiver 42 which receive signals transmitted from the respective marker stations. One output lead from receiver 42 is coupled to a timer circuit 45 which is triggered by a suitable signal from the receiver 42 to provide timing signals for the operation of base station 40. A received marker station signal, which is uniquely coded in digital form to identify the sending marker station, is coupled to a serial to parallel converter 46 and then stored in storage register 47.

A synchronized time code generator 50 has its parallel output leads coupled to normally closed gate 51 whose operation is under control of a first output signal from timer 45. Time code generator 50 may be the same type of apparatus as employed for TCG 26 in pig 12. The coded time signal which is in time code generator 50 at the instant a marker station signal is received at base station 40 is gated through gate 51 by a gating signal from timer 45 and is stored in storage register 54. The respective coded signals in registers 47 and 54 then are simultaneously shifted out of the registers by a shift pulse coupled from timer 45 on lead 56. The shifted coded signals both are recorded on magnetic tape recorder 58 in a manner so that they may be read out simultaneously. A signal from timer 45 then is coupled over lead 59 to tape advance means 60 to step advance the magnetic tape of recorder 58 so that it is in condition to record another received coded marker station signal and a simultaneously occurring coded time signal when a transmission is received from the next marker station along the pipeline.

It should be understood that the simplified representation of base station 40 in FIG. 1 is only an example since other apparatus and other instrumentations may be utilized to accomplish the desired result. The coded signals may be processed and recorded partially or wholly in serial fashion rather than parallel as illustrated. Any of the many known types of codes and code formats may be used for the time coded signals and for the coded marker station signals. Additionally, many telemetry systems and apparatus are known and may be used in the communication link between the marker stations and the base station.

Prior to the time that pig 12 is launched into pipeline 10, a known frequency and time relationship is established between the time coded generators 26 and 50. This may be accomplished by synchronizing both generators to a known standard. In accomplishing this synchronization, a model 890A VLF/LF Receiver, manufactured by Tracor Industrial Instruments, Austin, Texas may be used. This device can be used to compare the frequencies of the oscillators in the time code generators 26 and 50 with a reference frequency. An accurate frequency reference is provided by radio transmissions from the U.S. National Bureau of Standards radio station WWVB. A known relationship is also established between the time indications provided by the two time code generators. This may be done by synchronizing both generators to the time signals transmitted by NBS radio station WWV. As a matter of convenience, time code generators 26 and 50 provide time signals based on real time. Other time bases may be used.

After pig 12 has completed an inspection run through a section of pipeline 10 the pig is recovered and the magnetic tape is obtained from recorder 24.

In order to accurately correlate the records of the inspection signals on the tape from the pig recorder 24 to the known external locations of the marker stations, it is necessary to correlate the recorded time signals on the two tapes. This may be accomplished with the use of apparatus illustrated in simplified form in FIG. 2. Magnetic tape playback devices 62 and 64 are provided to play back the respective magnetic tapes from pig 12 and base station 40 of FIG. 1. Playback device 62 provides inspection signals on a plurality of output leads 66. These signals, assumed to be in analog form, are coupled to input terminals of strip chart recorder 67 which produces a visual recording of the inspection signals. A number of different types of strip chart recorders are known. One suitable type is a light beam oscillograph recorder designated Model 1508 Visicorder, manufactured by Honeywell, Test Instrument Division, Denver, Colo.

Figure 2:
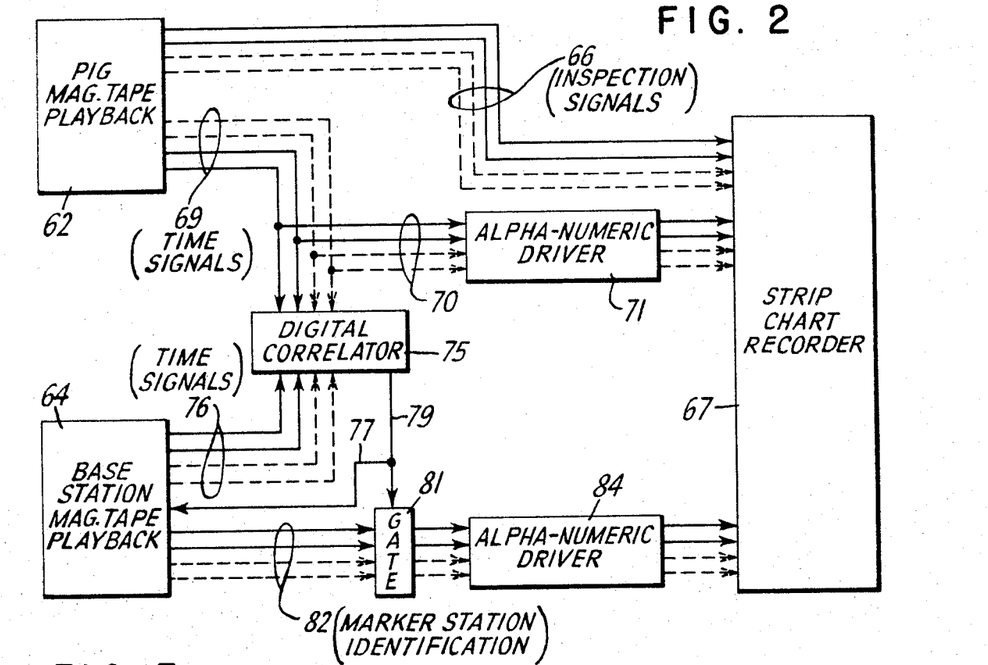
FIG. 2 is a simplified block diagram illustrating means for correlating time signals on two magnetic tapes to identify on a strip chart read out of inspection signals the locations of marker stations.

Playback device 62 also provides on output leads 69 the continuously occurring coded time signals that were recorded in pig 12. These coded time signals are coupled over leads 70 to an alpha-numeric driver, or converter, 71 which contains a numeric character generator that provides appropriate signals to permit strip chart recorder 67 to write the time signals on the strip chart in numbers representing the day, hour, minute, and second, for example, corresponding to the coded time signal. A suitable device for alpha-numeric driver 71 is a Honeywell Model 1204 Visiprinter. The strip chart recorder records time in a manner to provide an accurate real time scale for the inspection signals.

The coded time signals on leads 69 also are coupled as one set of inputs to digital correlator 75. The other set of inputs to the correlator are coded time signals on leads 76 from the base station playback device 64. Playback device 64 operates in step fashion, the tape being advanced in incremental steps by a step signal on an input lead 77. It will be recalled that at each incremental position of the tape in playback device 64 there is recorded a coded marker station signal and a coded time signal which represents the time that the pig was detected at that station.

In operation, digital correlator 75 holds a base station coded time signal from playback device 64 and compares this time signal against the continuously changing pig time signals from playback device 62. When a comparison, or correlation, of two time signals occurs, an output pulse is produced on lead 79. This pulse is coupled over lead 77 to playback device 64 to step it to its next incremental position at which the next coded marker station signal and accompanying coded time signal is recorded.

The correlation signal on lead 79 also is coupled to gate 81 whose inputs are the coded marker station signal which identify the marker station associated with the correlated time signal. Gate 81 is opened by the correlation signal on lead 79 and passes the coded marker station signal to alpha-numeric driver 84 which may be identical to the driver 71. The output signals from alpha-numeric driver 84 are coupled to strip chart recorder 67 which then produces on the strip chart a visual numeric record or indicium which uniquely identifies the corresponding marker station. The marker station indicia on the strip chart are located to precisely identify the known location of the marker station with reference to the inspection signal records and the recorded numeric time signals.

Figure 3:
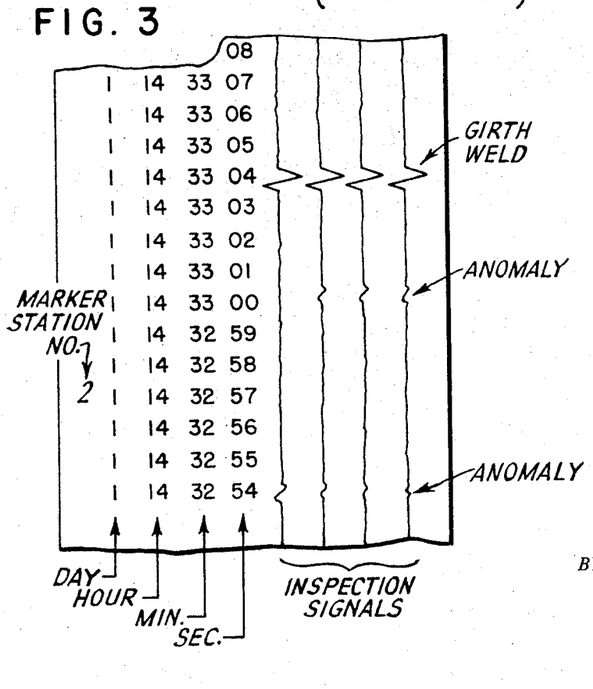
FIG. 3 is a representation of a short section of a strip chart made by the apparatus of FIG. 2.

An example of how a short strip of the printed record from strip chart 67 might appear is illustrated in FIG. 3. The analog inspection signals appear on the right side of the strip and the numeric print out of time signals appears along the left side. At the extreme left edge of the strip a station marker indicium is printed out to show the time that the pig passed that known external location along the pipeline. Looking now at the recorded inspection signals is seen that the girth welds in the pipeline were detected by all of the detector means on the pig and that anomalies in the pipe were detected by some but not all of the detector means. By knowing exactly where the marker stations are located, and by counting girth weld indications from the nearest marker station, and by knowing the approximate speed of travel of the pig in the pipeline, which can be obtained from the information on the strip chart, the actual locations of detected anomalies in the pipeline may be determined with considerable accuracy.

As previously mentioned, inspection signals may be recorded in digital form in pig 12. They also may be read out in the tape recorder 67, FIG. 2, in digital form.

It may be desired to prepare a master magnetic tape having thereon all of the correlated information that is contained on a strip chart readout from recorder 67, FIG. 2. This may be easily done by recording all of the input information in digital form. Referring to FIG. 2 and assuming that recorder 67 is a magnetic tape recorder, the inspection signals on leads 66 will be converted to digital form if they are not in that form. The respective time signals on leads 69 and 82 already are in digital coded form so that they may be recorded on the master tape in that form by eliminating alpha numeric drivers 71 and 84. If conversion to any different codes or code formats is desired before recording on a master tape, known conversion apparatus is commercially available or can be constructed by those skilled in the art.

It will be appreciated that means other than an exclusive radio link may be used to transmit time and marker station identification information back to a base station. For example, the marker stations and base station may be tied into existing private or commercial communication or telemetry systems.

Because of geographical considerations and/or because of power limitations on the radio transmitting equipment, it may be necessary to use two or more base stations disposed at spaced locations along the section of pipeline to be inspected. If a plurality of base stations are used, all will have their time code generators synchronized with a standard time source, and each one will receive transmissions from an assigned number of marker stations along a given portion of the pipeline route. On playback to correlate the time signals recorded at the base stations with the time signals recorded in the pig, the magnetic tapes from the base stations will be successively played back in their proper order and correlated with the pig magnetic tape.

Figure 4:
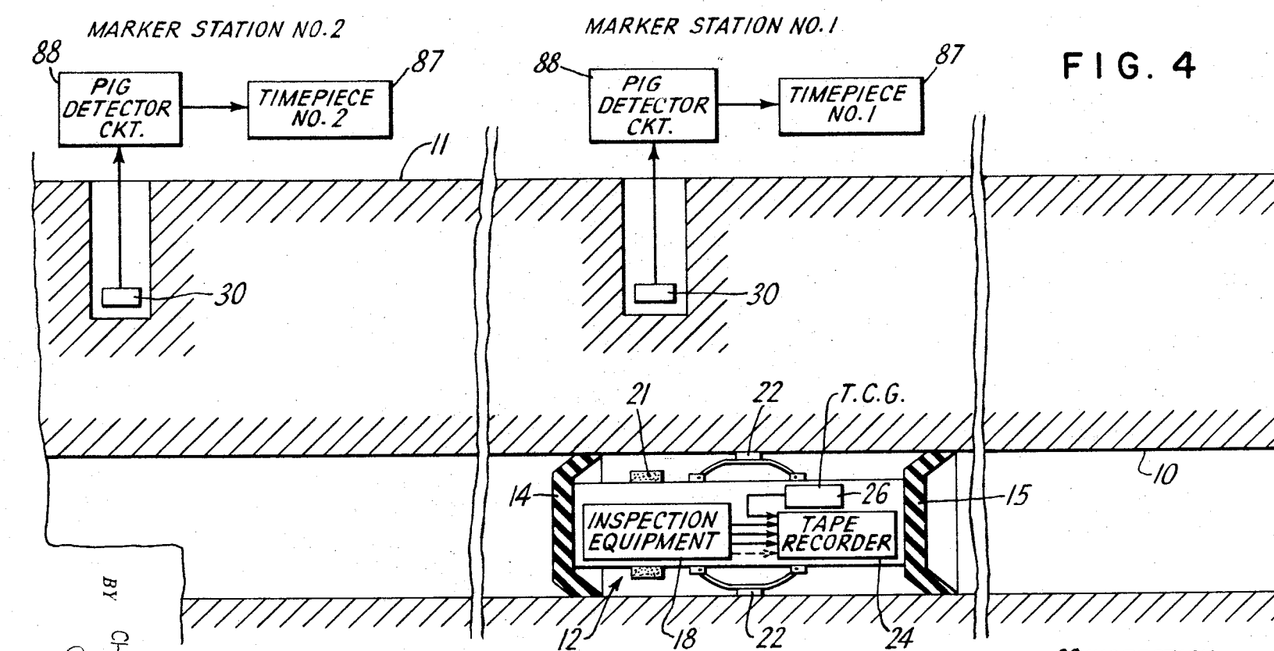
FIGS. 4 and 5 are simplified illustrations of means for practicing an alternative embodiment of the present invention.

FIG. 4 illustrates means for practicing the present invention wherein time information for accurately locating the marker stations is not transmitted to a base station but is made available at the respective marker stations.

In FIG. 4, the instrumented pig 12 is identical to the one illustrated in FIG. 1 and functions as described to provide in tape recorder 24 a magnetic tape having recorded tracks of inspection signals and an accompanying record of the coded time signals from time code generator 26.

Marker stations No. 1 and No. 2 include a pig sensor means 30 for detecting the presence of the pig 12 at the respective marker stations. Each marker station includes a timepiece 87 which may be synchronized to a known standard and which may be turned off in response to a signal from a pig detector circuit 88 which functions to produce the desired signal when sensor 30 senses the presence of pig 12. Timepieces 87 may be a digital clock, a time code generator, or any type of chronometer which may be stopped or which will provide a time readout in response to a suitable signal.

In operation, time code generator 26 in pig 12 is synchronized with, or a know time relationship is established with, the timepieces 87 at each of the marker stations. With the marker stations in operation, pig 12 passes through pipeline 10 performing its inspection function during which it records on a magnetic tape in recorder 24 inspection signals and time coded signals. When pig 12 is sensed at marker station 1, timepiece 87 is stopped, or provides a time readout, to indicate the exact time the pig was sensed at that station. As pig 12 continues its run through the pipeline, marker stations located successively further along the pipeline will provide respective indications of the time that pig 12 was sensed. After pig 12 has completed its inspection run of a section of the pipeline it will be recovered and the magnetic tape record will be obtained.

Figure 5:
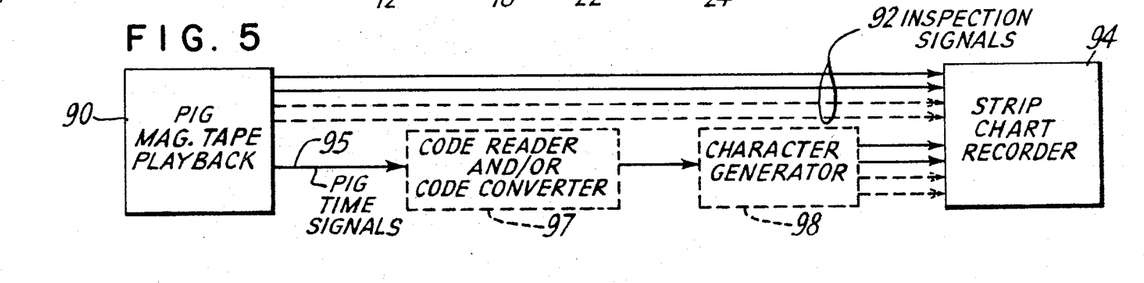

The method for correlating the known locations of the marker stations to the inspection records and time record made in the pig will be described by referring to FIG. 5. Playback device 90 plays back the recorded magnetic tape from pig 12 and the inspection signals, which are assumed to be analog, are coupled over leads 92 to strip chart recorder 94 where they are recorded as visible traces as in FIG. 2. Coded time signals from playback device 90 are coupled out on output lead 95 as coded electrical signals. These signals may be in parallel form or in series form as indicated in FIG. 5 by the single output lead 95. If it is desirable that the coded pig time signals be recorded on recorder 94 in real time numeric figures, appropriate apparatus such as code reader and/or converter 97 and character generator 98 will be provided. Character generator 98 may be the same type of apparatus as described for alpha numeric driver 84 in FIG. 2.

It may be acceptable to record the coded pig time signals on the strip chart of recorder 94 in a coded form, either symbolic or numeric, rather than converting them to numeric real time. With a little practice, an operator may read and interpret the recorded coded signals with considerable speed and facility.

The marker stations are visited by one or more crew members of the operating team to obtain the times that are registered on each of the timepieces 87. Having obtained this information an operator scans the strip chart of recorder 87 to find the corresponding times on the strip chart. He then enters appropriate marker station indicia or identifications adjacent the appropriate recorded times on the chart.

The present invention also may be practiced in the inspection of pipelines that are under water, such as the pipelines that connect off-shore platforms with shore facilities. In such an environment the marker stations also would be under water and in a system operating similarly to that shown in FIG. 1, their transmitters would transmit sonic energy to a sonar-type receiver which may be located near the shore or near the off-shore platform. Alternatively, the marker station may utilize a radio transmitter and antenna carried by a buoy that is moored to or adjacent the submerged pipeline. As a further alternative, the marker stations and base station may be connected by a cable.

In the explanations given above in connection with FIG. 1 it was assumed that a marker station transmitted a signal to base station 40 at the instant that pig 12 was detected, and it was further assumed that this marker station signal, and a corresponding time code signal from TCG 50 was recorded on magnetic tape recorder 58 at substantially the same instant. In some telemetry systems known in the art there is a measured time delay between the occurrence of a detected event and the identification of the transmitted signal at a base station. This delay occurs because of the manner of signal processing at the base station. This type of telemetering system often is employed when there is a limitation on the power of the radio transmitter at the telemetering sending station. In effect, what is accomplished in such a system is a trade-off of transmitter power against transmission time. In the processing of the received information at the receiving station, the equipment recognizes the signal that indicates the occurrence of an event at the sending station and automatically produces a correct time read out from information contained in the received transmission from the sending station. Such a system may be utilized in the practice of the present invention and is intended to be included in the scope of the following claims.

We claim:
1. A method for making a pipeline inspection record having thereon indications of known locations along the pipeline, said method comprising the steps
   performing nondestructive inspection of the pipeline with apparatus that moves through the pipeline and past said known locations,
   making on the apparatus a record of nondestructive inspection signals as the apparatus moves through the pipeline,
   simultaneously with the performance of the nondestructive inspection, providing on said record of inspection signals a time scale to represent time during the recording of said inspection signals,
   sensing externally of the pipeline to detect the arrival of the inspection apparatus at known locations spaced along the route of the pipeline,
   operating externally located timing means to provide respective time indications which represent the times the inspection apparatus is externally sensed at the known locations,
   searching a record of said inspection signals and time scale to identify positions on said record where the recorded time correspond to said externally produced time indications.

2. A method for producing on pipeline inspection record indications of the times that a pipeline pig passed respective known external locations spaced along the pipeline, said method comprising the steps
   moving a pipeline pig through the pipeline and past said known external locations,
   making with apparatus including timing and recording means carried by the pipeline pig a continuous record representing increments of time that occur during movement of the pipeline pig through the pipeline,
   producing with means including timing means located externally of the pipeline time indications representing the times that the pipeline pig passed the respective known locations,
   removing said continuous record from said pipeline pig at the conclusion of its passage through a given length of the pipeline,
   identifying those time increments that were recorded in the pig which correspond to the respective time indications that were produced externally when the pipeline pig passed the respective known locations.

3. The method claimed in claim 2 and including the following step which is performed prior to passing the pig through the pipeline, establishing a known time relationship between the timing means carried by the pipeline pig and the timing means located externally of the pipeline.

4. The method claimed in claim 2 where the step of externally producing time indications includes, sensing the passage of the pipeline pig past said known locations by the use of externally located sensing means that produces respective detection signals, and producing said time indications in response to said detection signals.

5. A method for indentifying on a pipeline inspection record the relative position of a known location along the pipeline, said method comprising the steps performing an inspection of the pipeline with apparatus that moves through the pipeline and past said known location, making on the apparatus a first record of inspection signals as the apparatus moves through the pipeline, simultaneously with the performance of the inspection, providing on said record of inspection signals successively occurring indications of time, detecting the presence of said apparatus at a known location along the pipeline, and external to the pipeline, providing a detection signal upon detection of the apparatus, providing in response to said detection signal, and with means that includes a timepiece located external to the pipeline, a representation of the time the moving apparatus was detected at said known location, comparing a record having said inspection signals and said successively occurring time indications thereon with said representation of the time that the inspection apparatus arrived at said known location to identify the time indication on the record which corresponds to the time that the apparatus arrived at the known location.

6. The method claimed in claim 5 and further including the steps producing in response to the detection signal a coded signal identifying said known location, transmitting the coded signal to a base station located remotely from the known location, receiving the transmitted coded signal at the base station, producing at the base station successively occurring time signals that bear a known time relationship to the indications of time recorded on the first record, recording on a second record at the base station the time signal produced there which represents the time the coded signal was received from the known location, and comparing the first and second records to identify the time indication on the first record which corresponds to the time signal on the second record.

7. A method for making a pipeline inspection record having thereon indications of known external locations along the route of the pipeline, said method comprising the steps placing one of a plurality of timepieces in a pipeline pig and placing the remainder of said timepieces external to the pipeline to be inspected, establishing a known time relationship between said timepieces, moving the pipeline pig containing said one timepiece through the pipeline, performing nondestructive inspection of the pipeline with apparatus carried by the pig as it moves through the pipeline and past said known external locations, making in the pig a continuous record of nondestructive inspection signals as the pig moves through the pipeline, simultaneously with the recording of inspection signals, recording on said record successively occurring representations of time as determined by said one timepiece, sensing externally of the pipeline to detect the arrival of the pig at the respective known locations, producing respective indications of time as determined by the externally located remainder of the timepieces in response to said sensing of the pig at the known locations, removing said record from the pipeline pig, searching said record of inspection signals and successively occurring time representations, or a record corresponding thereto, to identify the positions on the record where the time representations correspond to said indications of time.

8. The method claimed in claim 7 wherein the step of producing respective indications of time in response to said sensing of the pig at the known locations includes the steps transmitting a respective signal from each known location in response to the sensing of the pig thereat, receiving said transmitted signals at a base station located remotely from said known locations, said remainder of the timepieces being located at said base station, successively recording at the base station respective time indications provided by said remainder of the timepieces in response to said successively received signals.

9. The method claimed in claim 8 and including the steps playing back the record produced in said pig and the record produced at said base station and producing playback inspection signals and respective playback time signals of recorded times on said records, correlating the playback time signals, producing a correlating signal when the playback time signals are in correlation, simultaneously with the playing back of said two records, producing a third record of the playback inspection signals, and producing an indicia on said third record in response to said correlating signal to indicate adjacent the inspection signals the relative positions of the known locations.

10. Apparatus for making a pipeline inspection record and for indicating on the record the relative position of a known location along the route of the pipeline, comprising the combination inspection apparatus for providing inspection signals representing detected pipeline conditions, means for moving the inspection apparatus through the pipeline, timing means moving with the inspection apparatus through the pipeline for providing time signals, means included with said inspection apparatus for simultaneously recording said inspection signals and said time signals, means external to the pipeline for providing a second time signal indicating the time the moving apparatus arrived at said known location, playback means for playing back the record of inspection signals and time signals and for making an inspection record of said inspection signals, correlating means operating simultaneously with said playback means for correlating playback time signals with a signal corresponding to said second time signal for producing an indicium signal when correlation is achieved, and means for entering an indicium on said inspection record when correlation is achieved in the correlating means.

11. Apparatus claimed in claim 10 and further including means for establishing a known time relationship between said timing means and the means external to the pipeline, said known time relationship being established prior to inserting the pipeline inspection apparatus within the pipeline.

12. Apparatus for making a pipeline inspection record and for indicating on the record the relative position of a known location along the route of the pipeline, comprising the combination inspection apparatus for providing inspection signals representing detected pipeline conditions, means for moving the inspection apparatus through the pipeline, timing means moving with the inspection apparatus through the pipeline for providing time signals, means included with said inspection apparatus for simultaneously recording said inspection signals and said time signals, means including a second timing means external to the pipeline for providing a record of the time the moving apparatus arrived at said known location, said second timing means having a known time relationship to the timing means moving with the inspection apparatus, means for comparing said two records to identify the time signal on the record made on the inspection apparatus which corresponds to the recorded time that the device arrived at said known location.

13. Apparatus for making a pipeline inspection record and for indicating on the record the relative positions of known locations along the route of the pipeline, comprising the combination inspection apparatus for producing inspection signals representing detected pipeline conditions, means for moving the inspection apparatus through the pipeline and past said known locations, a first timing means included with said apparatus for producing time signals as the apparatus moves through the pipeline, means included with said apparatus for simultaneously recording said inspection signals and said time signals as the apparatus moves through the pipeline, means located externally of the pipeline at each of said known locations for detecting the presence of said apparatus at each of the respective locations and for producing respective detection signals upon detection of said apparatus at each of said locations, additional timing means located externally of the pipeline, the additional timing means having a predetermined time relationship with the first timing means, means external to the pipeline and operably connected with said additional timing means for producing a respective time indication in response to each of said detection signals, and means for comparing the recorded time signals on the record made in the pipeline with the respective time indications produced externally of the pipeline to identify the time signals which were recorded when the apparatus was detected at the respective known locations.

14. The apparatus claimed in claim 13 where the additional timing means located externally of the pipeline includes a plurality of timepieces each located at a respective known location, and wherein said means operably connected to the additional timing means includes respective means at each known location responsive to a respective detection signal for causing the respective timepiece to produce a time indication.

15. The apparatus claimed in claim 13 wherein the means external to the pipeline and operably connected to said additional timing means includes, transmitting means located at each of said locations and responsive to a respective detection signal for transmitting a corresponding detection signal to a base station located remotely from the known locations, receiving means located at said base station for receiving said corresponding detection signals from the known locations, said additional timing means comprising a second timing means at said base station, means responsive to said received corresponding detection signals and operable with said second timing means for producing a second record of successive time indications produced by the second timing means at the times that respective corresponding detection signals were received.

16. The apparatus claimed in claim 15 and further including playback means for simultaneously playing back the record produced in the pipeline and the second record produced at the base station, thereby to produce corresponding playback inspection signals, playback time signals, and playback time indications, means for correlating said playback time signals and said playback time indications to produce a correlation signal each time a predetermined correlation is achieved, means for producing a third record of playback inspection signals, and means responsive to correlation signals for providing an indicium on said third record to identify the inspection signals that occur in coincidence with a correlation signal, thereby to locate on said third record the relative positions of said known locations.

17. The apparatus claimed in claim 16 and further including means responsive to said playback time signals for recording corresponding times on said third record along with the recorded inspection signals.

* * * * *